(12) United States Patent
Ji et al.

(10) Patent No.: US 12,386,380 B2
(45) Date of Patent: Aug. 12, 2025

(54) DIAL AND OPERATING MECHANISM

(71) Applicant: FUJIFILM Corporation, Tokyo (JP)

(72) Inventors: Yangbae Ji, Saitama (JP); Takayuki Shimizu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 149 days.

(21) Appl. No.: 18/474,257

(22) Filed: Sep. 26, 2023

(65) Prior Publication Data

US 2024/0111324 A1    Apr. 4, 2024

(30) Foreign Application Priority Data

Sep. 30, 2022  (JP) .................................. 2022-157494

(51) Int. Cl.
*G05G 1/10* (2006.01)
*G05G 1/015* (2008.04)
*G05G 5/05* (2006.01)
*H04N 23/50* (2023.01)

(52) U.S. Cl.
CPC ............... *G05G 1/10* (2013.01); *G05G 1/015* (2013.01); *G05G 5/05* (2013.01); *H04N 23/50* (2023.01); *G05G 2505/00* (2013.01)

(58) Field of Classification Search
CPC ............ G05G 1/10; G05G 1/015; G05G 5/05; G05G 2505/00; G05G 9/02; G05G 1/02; H04N 23/50; H04N 23/62; H01H 19/02; H01H 19/10; H01H 19/14; G01D 21/02; G03B 17/00; G03B 2217/002; G03B 17/02; G03B 7/097; G03B 17/18; G06F 3/0362; G06F 3/016; G06F 3/0338; H02N 2/163; H02N 2/026; H02N 2/062; H02N 2/14; H02N 2/001; H02N 2/004; H02N 2/04; H02N 2/106; B60K 2360/126; B60K 2360/131; B60K 35/10; B60K 2360/133; B60K 2360/135; B60K 35/00; B60K 35/50; B60K 35/60; B60K 35/80
See application file for complete search history.

(56) References Cited

U.S. PATENT DOCUMENTS

| | | | | |
|---|---|---|---|---|
| 7,366,409 | B2* | 4/2008 | Kurosawa | H04N 23/66 396/543 |
| 2012/0267222 | A1* | 10/2012 | Gohng | G06F 3/0362 200/61.54 |
| 2015/0160683 | A1* | 6/2015 | Fust | G05G 1/08 74/490.12 |
| 2015/0369358 | A1* | 12/2015 | Lee | F16H 61/24 74/507 |

FOREIGN PATENT DOCUMENTS

| | | |
|---|---|---|
| JP | H09265860 | 10/1997 |
| JP | 3920567 | 5/2007 |

* cited by examiner

*Primary Examiner* — Abdelaaziz Tissire
(74) *Attorney, Agent, or Firm* — JCIPRNET (57) ABSTRACT

A first dial includes: a rotatable dial member having a shaft portion; a moving mechanism that moves the dial member in a Z1 direction; and a flexible print substrate having a first sensor that detects rotation of the dial member and a second sensor that detects a position of the dial member moved by the moving mechanism, in which the flexible print substrate is disposed on a Z1 direction side with respect to the shaft portion.

12 Claims, 11 Drawing Sheets

DIAL AND OPERATING MECHANISM

CROSS-REFERENCE TO RELATED APPLICATIONS

This application claims priority under 35 U.S.C § 119(a) to Japanese Patent Application No. 2022-157494 filed on 30 Sep. 2022. The above application is hereby expressly incorporated by reference, in its entirety, into the present application.

BACKGROUND OF THE INVENTION

1. Field of the Invention

The present invention relates to a dial and an operating mechanism used in an electronic apparatus.

2. Description of the Related Art

A rotary encoder with a push switch disclosed in JP1997-265860A (JP-H9-265860A) comprises: a rotary contact plate having an operation knob (dial member); an attachment substrate comprising an elastic leg that elastically contacts the rotary contact plate to generate an elastic signal; a driving body that rotatably holds the rotary contact plate and is bonded to a side portion of the attachment substrate so as to be swingable parallel to an attachment substrate surface; a switch portion in which a dome-shaped movable contact is placed on a fixed contact planted on the attachment substrate; and an L-shaped actuator that is formed in an L shape consisting of an arm perpendicular to the attachment substrate surface abutting on one end of the driving body and an arm that extends from the arm in a direction of the switch portion and whose tip abuts on the dome-shaped movable contact, the L-shaped actuator being held on the attachment substrate so as to be rotationally moved with an intersecting portion of both arms as a support shaft. In a case in which a force is applied to an operation knob against an elastic operating force of the dome-shaped movable contact, the rotary contact plate and the entire driving body swing, the driving body pushes and rotates the L-shaped actuator, and the tip of the arm of the L-shaped actuator pushes the dome-shaped movable contact downward, so that the dome-shaped movable contact reversely operated, causing a short circuit between switch terminals.

A combined operation electric component disclosed in JP3920567B comprises: a rotary knob (dial member); a slider that rotates integrally with the rotary knob; a sliding pattern portion on which the slider slides; a movable component part that slidingly moves the rotary knob by pressing the rotary knob in a direction substantially orthogonal to an axis of the rotary knob; and a push button switch that has a dome-shaped click spring and is operated by being pushed by a pressing protrusion provided on the movable component part.

SUMMARY OF THE INVENTION

An embodiment according to the technology of the present disclosure provides a dial and an operating mechanism capable of saving space in an axial direction and improving an efficiency of component arrangement.

A dial according to one aspect according to the technology of the present disclosure comprises a dial member, a moving mechanism, and an electronic member, in which the electronic member is disposed on a first direction side with respect to a shaft portion. The dial member has a shaft portion and is rotatable. The moving mechanism moves the dial member in a first direction. The electronic member has a first sensor and a second sensor. The first sensor detects rotation of the dial member. The second sensor detects a position of the dial member moved by the moving mechanism.

It is preferable that the first sensor is disposed in a direction away from the dial member with respect to an end part of the shaft portion. It is preferable that the dial is an operation dial disposed in an imaging apparatus.

A dial according to another aspect according to the technology of the present disclosure comprises a dial member, a moving mechanism, and an electronic member, in which the first sensor is disposed in a direction away from the dial member with respect to an end part of the shaft portion.

It is preferable that the dial further comprises: a prevention portion for preventing the electronic member from entering a rotation range of the dial member. It is preferable that the prevention portion is included in the moving mechanism.

It is preferable that the electronic member includes a first mounting portion on which the first sensor is mounted, a second mounting portion on which the second sensor is mounted, and a first relay portion that connects the first mounting portion and the second mounting portion.

It is preferable that the moving mechanism has two biasing members that bias the dial member in a second direction opposite to the first direction, and the first relay portion is disposed between the two biasing members.

An operating mechanism according to one aspect according to the technology of the present disclosure comprises: the dial; and an operating portion, in which the electronic member includes a third mounting portion having a connecting portion with the operating portion, and a second relay portion that connects the second mounting portion and the third mounting portion, the operating portion includes a movable portion that moves in the second direction close to the dial and that has a first projection portion and a second projection portion protruding toward a dial side, and the second relay portion is disposed between the first projection portion and the second projection portion.

It is preferable that the dial further comprises: a rotation mechanism that rotates the dial member; a support member that is included in the rotation mechanism and rotatably supports the dial member; and a fastening member that screw-fastens the electronic member to the support member.

It is preferable that the fastening member is disposed in a direction away from the dial member with respect to the support member. It is preferable that the first direction is a direction intersecting an axial direction of the shaft portion.

DESCRIPTION OF THE PREFERRED EMBODIMENTS

First Embodiment

Figure 1:
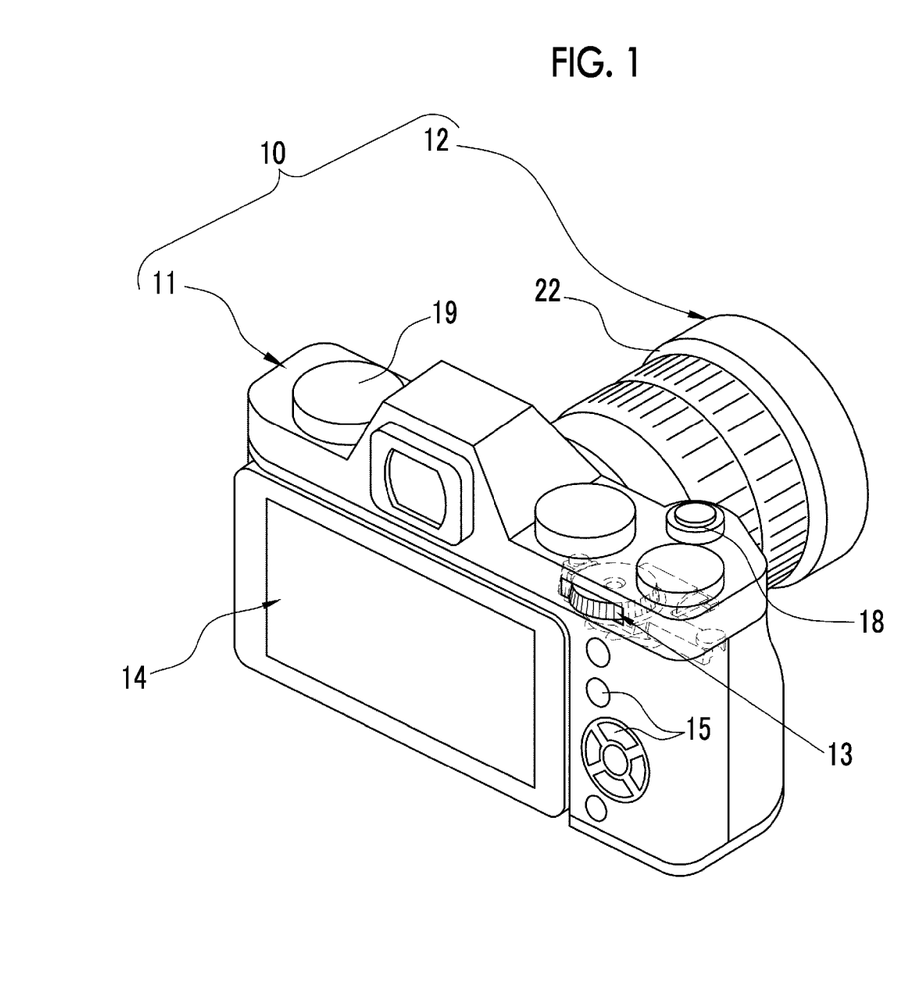
FIG. 1 is a rear perspective view of an imaging apparatus.

As shown in FIG. 1, a digital camera 10 comprises a camera body 11 and an interchangeable lens barrel 12. A first dial 13, a display 14, an operation button 15, and the like are provided on a back surface of the camera body 11. The first dial 13 corresponds to a "dial" in the claims. The display 14 is a liquid crystal display (LCD), an organic electroluminescent display (OELD), or the like. The display 14 is used for displaying a live view image, displaying a captured image, displaying a setting menu, and the like.

Figure 2:
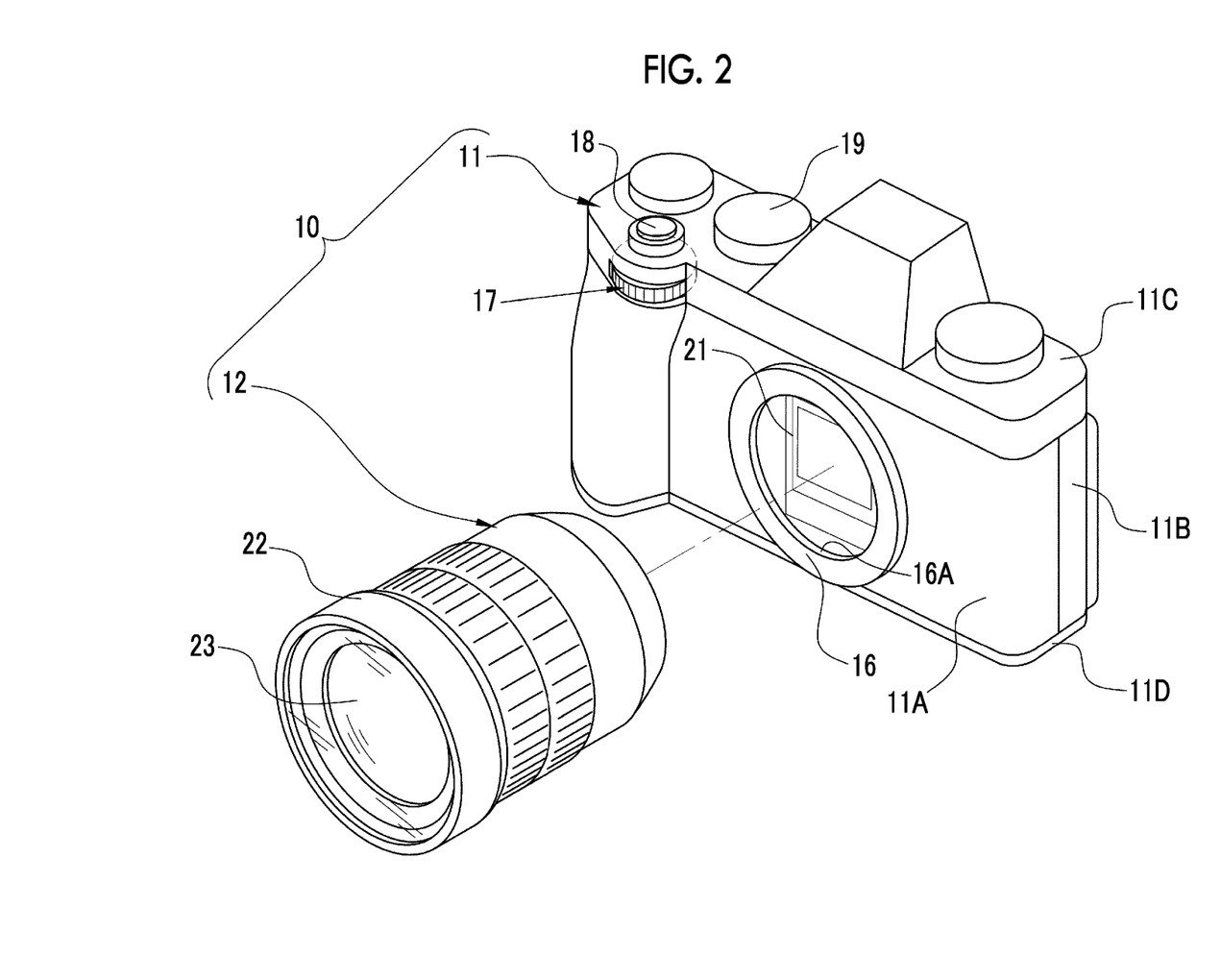
FIG. 2 is a front perspective view of the imaging apparatus.

As shown in FIG. 2, a lens mount 16 and a second dial 17 are provided on a front surface of the camera body 11. The lens mount 16 has a circular imaging aperture 16A. The lens barrel 12 is attachably and detachably attached to the lens mount 16. In addition, a release switch 18, an operation dial 19, and the like are provided on an upper surface of the camera body 11.

An imaging element 21 is built in the camera body 11. The imaging element 21 is, for example, a complementary metal oxide semiconductor (CMOS) image sensor, a charge coupled device (CCD) image sensor, or an organic thin film imaging element.

The lens barrel 12 comprises a lens barrel body 22, an imaging optical system 23, and the like. The lens barrel body 22 has a cylindrical shape and holds the imaging optical system 23 therein, and is provided with a lens mount and a lens-side signal contact (not shown) at a rear end thereof. The imaging optical system 23 images subject light on the imaging element 21 in a case in which the lens barrel 12 is attached to the camera body 11.

The camera body 11 has a front case 11A, a rear case 11B, a top case 11C, and a bottom case 11D. The front case 11A, the rear case 11B, the top case 11C, and the bottom case 11D are combined to form an exterior case of the camera body 11.

Figure 3:
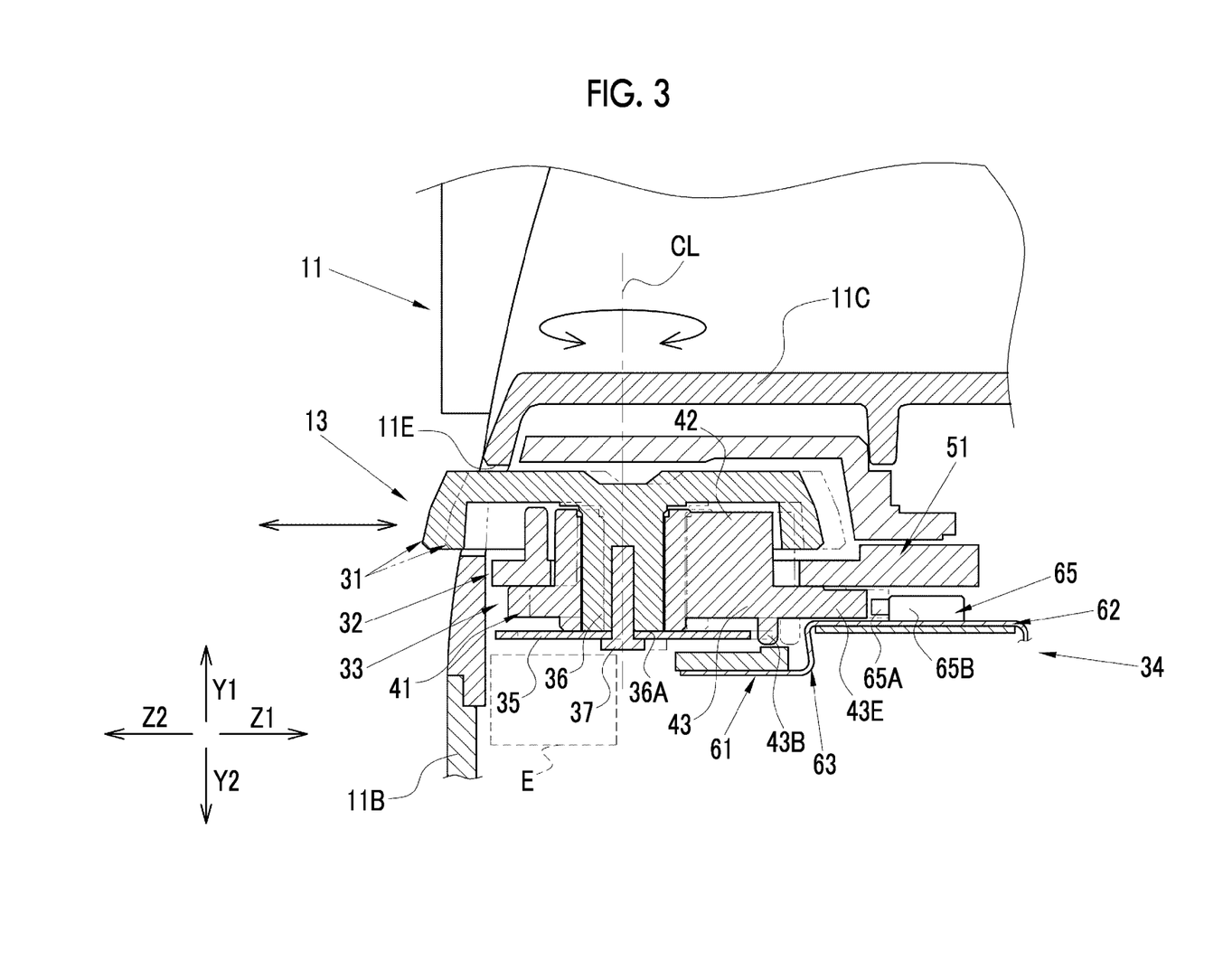
FIG. 3 is a cross-sectional view of a main part of the imaging apparatus.

As shown in FIG. 3, the first dial 13 comprises a dial member 31, a moving mechanism 32, a rotation mechanism 33, a flexible print substrate 34, and a rotary plate 35. The first dial 13 is incorporated in an upper portion on a back surface side of the camera body 11.

The dial member 31 is formed in a disk shape and has a shaft portion 36. A knurl is formed on an outer peripheral surface of the dial member 31. A through-hole 11E is formed on a back surface of the top case 11C, and a part of the dial member 31 protrudes to an outside of the camera body 11 through the through-hole 11E.

As will be described below, the dial member 31 is movable in Z1 and Z2 directions by the moving mechanism 32, and is rotatable around a rotation axis CL parallel to Y1 and Y2 directions by the rotation mechanism 33. In the present embodiment, the Z1 and Z2 directions are directions parallel to a front-back direction of the digital camera 10. The Z2 direction is a direction opposite to the Z1 direction.

The Y1 and Y2 directions are directions orthogonal to the Z1 and Z2 directions. The Y2 direction is a direction opposite to the Y1 direction. In addition, X1 and X2 directions are directions orthogonal to the Z1 and Z2 directions and the Y1 and Y2 directions. In the present embodiment, the X1 and X2 directions are left and right directions (see FIG. 4) of the digital camera 10. The X2 direction is a direction opposite to the X1 direction. In the present specification, the word "orthogonal" includes not only the meaning of perfect orthogonality but also the meaning of substantial orthogonality including errors allowed in design and manufacturing. The word "parallel" includes not only the meaning of perfect parallel but also the meaning of substantial parallel including errors allowed in design and manufacturing.

In addition, in the present embodiment, the Z1 and Z2 directions are directions orthogonal to the rotation axis CL of the dial member 31, but the present invention is not limited to this, and the Z1 and Z2 directions need only be directions intersecting the rotation axis CL.

Figure 4:
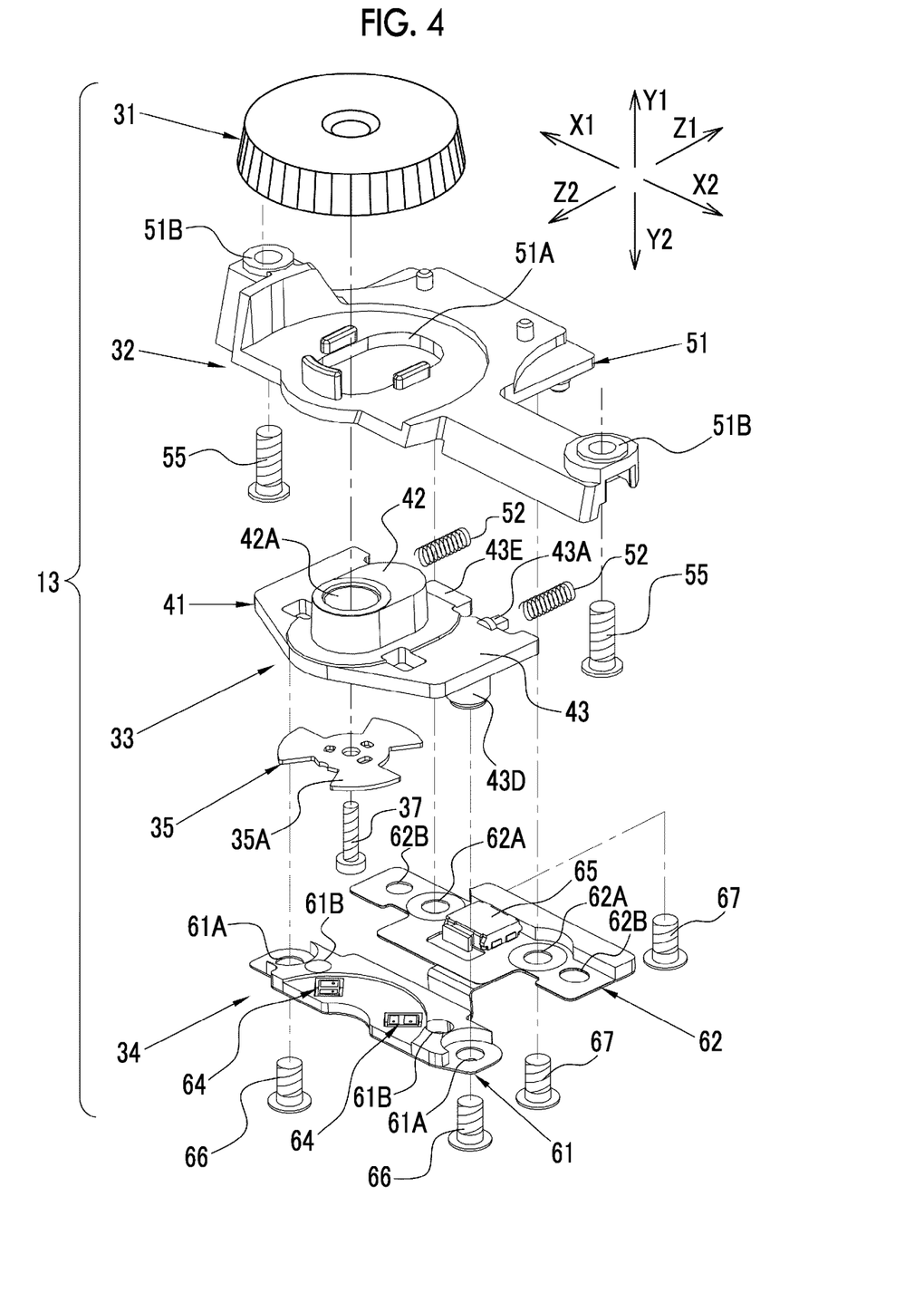
FIG. 4 is an exploded perspective view of a dial according to an aspect of the present invention.

As shown in FIG. 4, the rotation mechanism 33 comprises a support member 41. The support member 41 is provided with a fitting portion 42 and a plate-shaped portion 43. The support member 41 is also included in the moving mechanism 32, as will be described below.

The fitting portion 42 is formed in a rounded rectangular shape, that is, in a tubular shape having a cross section in which two semicircular shapes are connected by parallel straight lines. The fitting portion 42 has a fitting hole 42A into which the shaft portion 36 of the dial member 31 is fitted. The support member 41 rotatably supports the dial member 31 by fitting the fitting hole 42A and the shaft portion 36.

The rotary plate 35 is disposed at an end part 36A of the shaft portion 36. The rotary plate 35 is screw-fastened to the shaft portion 36 by screwing a screw member 37 that penetrates the rotary plate 35 and the shaft portion 36. As described above, the shaft portion 36 penetrates the fitting portion 42. Therefore, the rotary plate 35 disposed at the end part 36A of the shaft portion 36 is located on a Y2 direction side of the plate-shaped portion 43. The rotary plate 35 has irregularities on an outer periphery thereof, and rotation is detected by a first sensor 64, which will be described below.

Figure 5:
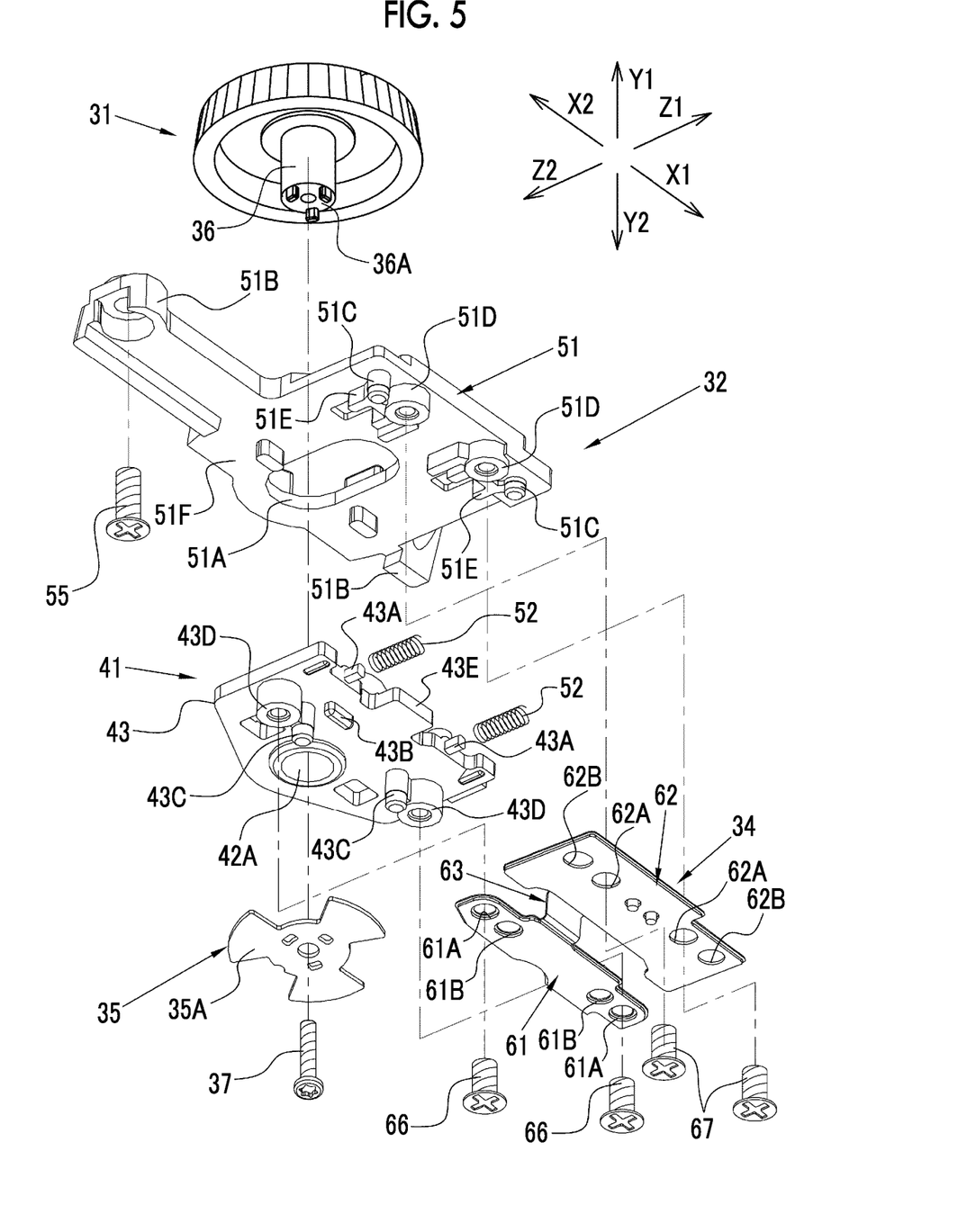
FIG. 5 is an exploded perspective view of a dial as viewed from a bottom surface side.

As shown in FIG. 5, the moving mechanism 32 comprises a fixing member 51, two spring members 52, and the support member 41. The spring member 52 corresponds to a "biasing member" in the claims. The fixing member 51 is formed in a plate shape that is one size larger than the support member 41. The fixing member 51 includes a moving hole portion 51A, a camera body attachment portion 51B, a positioning pin 51C, a fastening portion 51D, and two spring member accommodating portions 51E.

The moving hole portion 51A is a through-hole having a rounded rectangular shape disposed along the Z1 and Z2 directions, and is fitted with the fitting portion 42 of the support member 41. The moving hole portion 51A is formed to have a dimension in the Z1 and Z2 directions longer than a dimension of the fitting portion 42. Accordingly, the fitting portion 42, that is, the support member 41 can move in the Z1 and Z2 directions along the moving hole portion 51A. In a case in which the fitting portion 42 is fitted into the moving hole portion 51A, the plate-shaped portion 43 is located on the Y2 direction side of the fixing member 51.

The camera body attachment portion 51B extends in the X1 and X2 directions, and has a through-hole through which a screw member 55 penetrates. The fixing member 51 is fixed to the top case 11C, that is, an inside of an exterior of the camera body 11 by screwing the screw member 55 that penetrates the camera body attachment portion 51B into the top case 11C.

A second mounting portion 62, which will be described below, is attached to the positioning pin 51C and the fastening portion 51D. The spring member accommodating portion 51E is a U-shaped frame portion formed on a bottom surface side (Y2 direction side) of the fixing member 51 and accommodating the spring member 52 therein.

The plate-shaped portion 43 of the support member 41 includes a spring member attachment portion 43A, an entry prevention portion 43B, a positioning pin 43C, a fastening portion 43D, and a pressing protrusion 43E. The spring member attachment portion 43A is a pair of protruding portions protruding from an end part of the plate-shaped portion 43 in the Z1 direction. The spring member 52 is attached to the spring member attachment portion 43A in parallel with the Z1 and Z2 directions.

Figure 6:
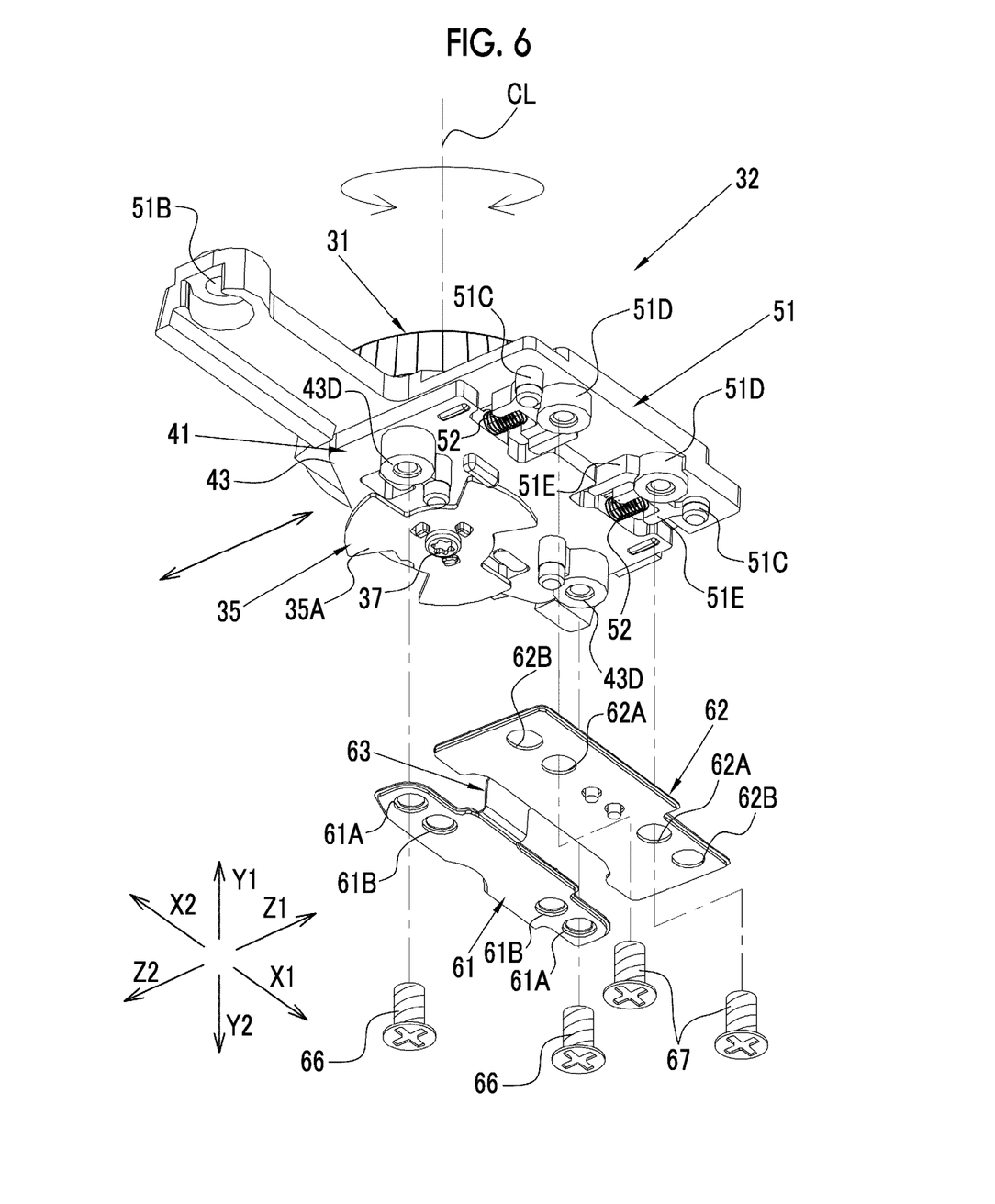
FIG. 6 is a perspective view showing a state where a flexible print substrate is removed from the dial according to the aspect of the present invention.

As shown in FIG. 6, in a case in which the fitting portion 42 of the support member 41 is fitted into the moving hole portion 51A, the spring member 52 attached to the spring member attachment portion 43A is accommodated in the spring member accommodating portion 51E of the fixing member 51. Therefore, the spring member 52 is disposed to be interposed between the fixing member 51 and the support member 41. Accordingly, the spring member 52 biases the support member 41 and the dial member 31 in the Z2 direction. In the moving mechanism 32, in a case in which the dial member 31 is pressed in the Z1 direction, the moving hole portion 51A guides the fitting portion 42, and the dial member can move in the Z1 direction against the biasing of the spring member 52 (a state shown by a two-dot chain line in FIG. 3). In addition, in a case in which the pressing against the dial member 31 is released, the moving mechanism 32 can bias the dial member 31 in the Z2 direction by the spring member 52 to return the dial member 31 to the initial position (a state shown by a solid line in FIG. 3).

A first mounting portion 61, which will be described below, is attached to the positioning pin 43C and the fastening portion 43D. The pressing protrusion 43E is a protrusion that is located between the spring member attachment portions 43A and that protrudes from an end edge of the plate-shaped portion 43 in the Z1 direction. The entry prevention portion 43B is a protrusion that protrudes from a bottom surface of the plate-shaped portion 43 in the Y2 direction (see FIG. 3).

The flexible print substrate 34 comprises the first mounting portion 61, the second mounting portion 62, a first relay portion 63, a first sensor 64, and a second sensor 65. The first mounting portion 61 has a rectangular plate shape and has a fastening hole 61A and a positioning hole 61B. The first sensor 64 is mounted on an upper surface of the first mounting portion 61. Two first sensors 64 are located on the same circumference about the rotation axis CL.

The positioning hole 61B is fitted with the positioning pin 43C of the support member 41. Accordingly, the positioning of the first mounting portion 61 with respect to the support member 41 is performed. The fastening hole 61A is provided at a position matching the fastening portion 43D of the support member 41. The first mounting portion 61 is screw-fastened to the support member 41 by screwing a screw member 66 that penetrates the fastening hole 61A into the fastening portion 43D. The screw member 66 corresponds to a "fastening member" in the claims. The screw member 66 is disposed in a direction away from the dial member 31 with respect to the support member 41, that is, in the Y2 direction.

In the Y1 and Y2 directions, the first mounting portion 61 is attached to the plate-shaped portion 43 with a certain interval therebetween. This certain interval is a gap through which the rotary plate 35 can pass. As described above, the rotary plate 35 is located on the Y2 direction side of the plate-shaped portion 43 of the support member 41. Therefore, the rotary plate 35 passes through the gap between the plate-shaped portion 43 and the first mounting portion 61 spaced from the plate-shaped portion 43 by a certain interval.

The first sensor 64 is an optical sensor, and uses, for example, a photo reflector. As described above, the first sensor 64 is mounted on the first mounting portion 61. Therefore, the first sensor 64 is disposed in a direction away from the dial member 31, that is, in the Y2 direction with respect to the rotary plate 35 located at the end part 36A of the shaft portion 36.

The first sensor 64 has a light emitting section and a light receiving section. The light emitting section of the first sensor 64 emits light toward a projection portion 35A of the rotary plate 35, and the light receiving section receives the light reflected by the projection portion 35A of the rotary plate 35. Through the output from the first sensor 64, the rotation of the dial member 31, specifically, a rotation amount and a rotation direction of the dial member 31 can be detected.

The second mounting portion 62 has a rectangular plate shape and is disposed in the Z1 direction with respect to the first mounting portion 61. The second mounting portion 62 has a fastening hole 62A and a positioning hole 62B. The second sensor 65 is mounted on an upper surface of the second mounting portion 62. The present invention is not limited to this, and a controller having a processor function may be mounted on the first mounting portion 61 and/or the second mounting portion 62.

The positioning hole 62B is fitted with the positioning pin 51C of the fixing member 51. Accordingly, the positioning of the second mounting portion 62 with respect to the fixing member 51 is performed. The fastening hole 62A is provided at a position matching the fastening portion 51D of the fixing member 51. The second mounting portion 62 is screw-fastened to the fixing member 51 by screwing a screw member 67 that penetrates the fastening hole 62A into the fastening portion 51D. In addition, the second mounting portion 62 supports the support member 41 in the Y1 direction. In the Y1 and Y2 directions, the second mounting portion 62 is attached to a bottom surface 51F of the fixing member 51 with a certain interval therebetween. This certain interval is a gap through which the plate-shaped portion 43 of the support member 41 can pass.

As described above, the plate-shaped portion 43 is located on the Y2 direction side of the fixing member 51. Therefore, the plate-shaped portion 43 passes through the gap between the fixing member 51 and the second mounting portion 62 spaced from the fixing member 51 by a certain interval. Accordingly, the support member 41 can move in the Z1 and Z2 directions.

The second sensor 65 is a mechanical switch. The second sensor 65 is disposed at a position facing the pressing protrusion 43E of the support member 41. In a case in which the support member 41 moves in the Z1 direction, the second sensor 65 receives the pressure from the pressing protrusion 43E, and a pressed portion 65A is pushed into a case 65B (see FIG. 3). By pushing the pressed portion 65A, a contact (not shown) inside the case 65B is turned on.

Therefore, the second sensor 65 can detect a position of the dial member 31 moved by the moving mechanism 32. In addition, in a case in which the pressing against the dial member 31 is released, the pressing against the pressed portion 65A by the pressing protrusion 43E is also released. In a case in which the pressing against the pressed portion 65A is released, the pressed portion 65A is biased by a biasing member (not shown) inside the case 65B and returns to the initial position.

The first relay portion 63 connects the first mounting portion 61 and the second mounting portion 62. As described above, the first mounting portion 61 is fixed to the support member 41, the second mounting portion 62 is fixed to the fixing member 51, and the support member 41 is movable in the Z1 and Z2 directions with respect to the fixing member 51. Therefore, the first relay portion 63 is formed to have a length with a margin in the Z1 and Z2 directions so as not to impede the movement of the support member 41.

As described above, the first relay portion 63 is formed to have a length with a margin, so that in a case in which the first relay portion 63 enters a range in which the dial member 31 rotates, the rotation of the dial member 31 is impeded. In the present embodiment, the entry prevention portion 43B is provided to match a position of the first relay portion 63. Since the entry prevention portion 43B moves in the Z1 and Z2 directions together with the support member 41, the entry prevention portion 43B abuts on the first relay portion 63 and prevents the first relay portion 63 from moving in a Z2 direction side. That is, the entry prevention portion 43B prevents the first relay portion 63 from entering the range in which the dial member 31 rotates.

Figure 7:
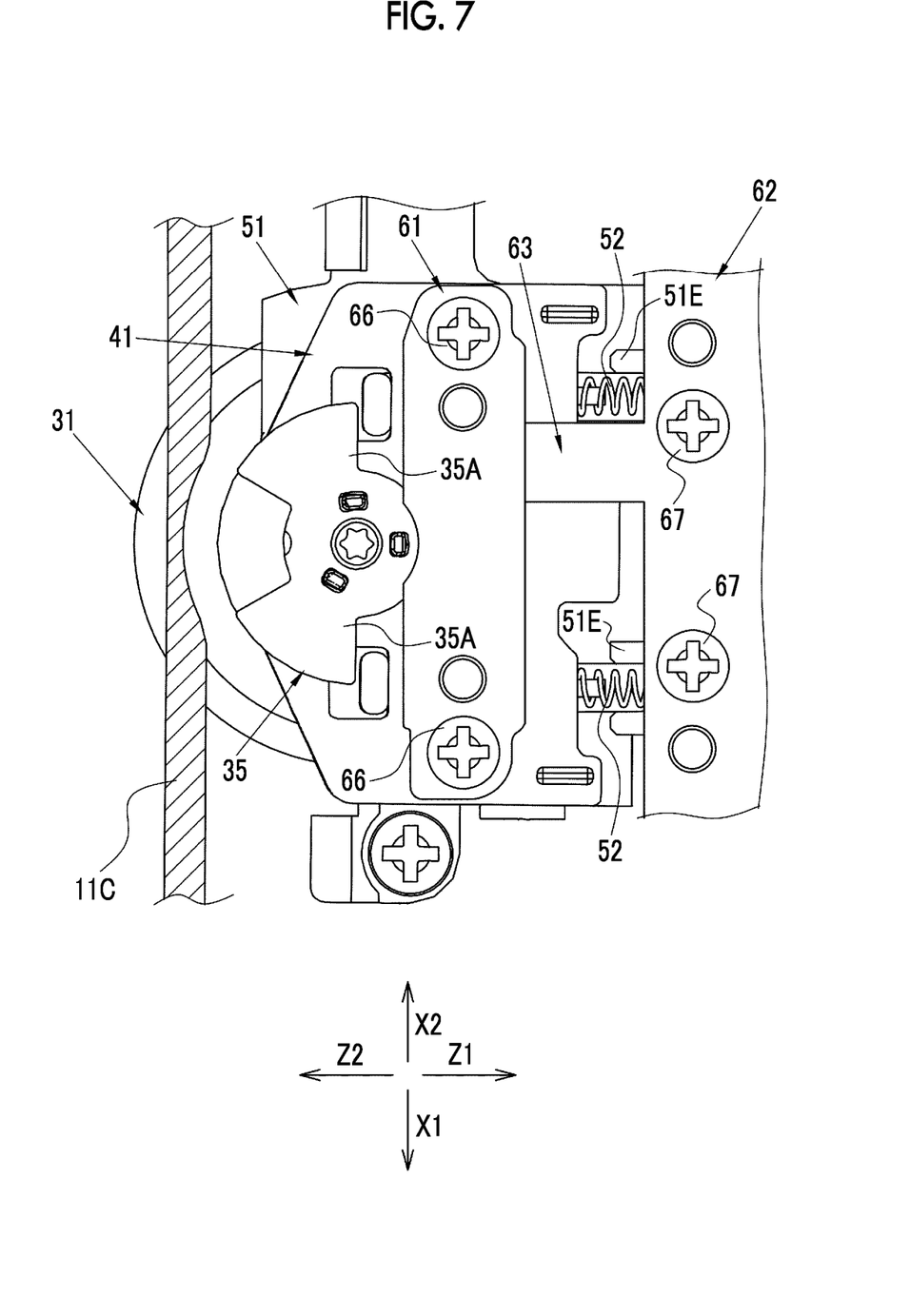
FIG. 7 is a cross-sectional view of a main part of the dial as viewed from the bottom surface side.

As shown in FIG. 7, the first relay portion 63 is disposed between the two spring members 52 that bias the support member 41 and the dial member 31. The first relay portion 63 is a part of the flexible print substrate 34 and has a large reaction force. That is, in a case in which the first relay portion 63 receives the pressure from the support member 41, a force for pushing back the support member 41 and the dial member 31 is large. In a case in which the first relay portion 63 is located on an outer side of the two spring members 52, a reaction force on a side where the first relay portion 63 is located becomes large, and the operability deteriorates. On the other hand, in the present embodiment, the first relay portion 63 is disposed between the two spring members 52, so that the force for pushing back the support member 41 and the dial member 31 is prevented from being biased, and the operability is improved. In addition, since there is a margin for component arrangement between the two spring members 52, the efficiency of component arrangement can be improved by disposing the first relay portion 63 at this position.

Next, an action of the digital camera 10 according to the present embodiment will be described. In a case of operating the first dial 13, the moving mechanism 32 and the rotation mechanism 33 are provided as described above, so that the dial member 31 can be rotated and pressed, and a user can perform various operations. Further, in the first dial 13, the flexible print substrate 34 is disposed on a Z1 direction side with respect to the shaft portion 36 of the dial member 31. Accordingly, on the Z2 direction side of the shaft portion 36 (a range E surrounded by a dotted line in FIG. 3), there is a margin for component arrangement. Further, it is possible to save space in the Y1 and Y2 directions which are the axial directions of the first dial 13, and it is possible to improve the efficiency of component arrangement.

In addition, in the first dial 13, the first sensor 64 that detects the rotation is disposed in a direction away from the dial member 31, that is, in the Y2 direction with respect to the end part 36A of the shaft portion 36, so that it is possible to save space in the Y1 and Y2 directions and to improve the efficiency of component arrangement. In a case in which, as in the dial in the related art, the first sensor that detects the rotation is disposed in a direction close to the dial member with respect to the end part of the shaft portion, a length of the shaft portion of the dial increases and components are disposed up to the end part of the shaft portion, which impedes space saving. On the other hand, in the present embodiment, the first sensor 64 is disposed in a direction away from the dial member 31 with respect to the end part 36A of the shaft portion 36, so that the shaft portion 36 can be made shorter than in the related art, which makes it possible to improve a degree of freedom in component arrangement. Accordingly, it is possible to save space.

In the first embodiment, in the first dial 13, the flexible print substrate 34 is disposed on the Z1 direction side with respect to the shaft portion 36 of the dial member 31, and the first sensor 64 is disposed in a direction away from the dial member 31 with respect to the end part 36A of the shaft portion 36, but the present invention is not limited to this, and a part of the configuration may be omitted. For example, the limitation that the flexible print substrate 34 is disposed on the Z1 direction side with respect to the shaft portion 36 of the dial member 31 may be removed from the configuration of the first embodiment. Even in this case, the first sensor 64 is disposed in a direction away from the dial member 31 with respect to the end part 36A of the shaft portion 36, so that it is possible to save space and improve the efficiency of component arrangement.

In addition, the limitation that the first sensor 64 is disposed in a direction away from the dial member 31 with respect to the end part 36A of the shaft portion 36 may be removed from the configuration of the first embodiment. Even in this case, the flexible print substrate 34 is disposed on the Z1 direction side with respect to the shaft portion 36 of the dial member 31, so that there is a margin in the space on the Z2 direction side of the shaft portion 36, which enables space saving and improves the efficiency of component arrangement.

Second Embodiment

In the first embodiment described above, the configuration to which the dial according to the embodiment of the present invention is applied is illustrated, but the present invention is not limited to this, and, in a second embodiment described below, an operating mechanism including a dial and other operating portions is applied.

Figure 8:
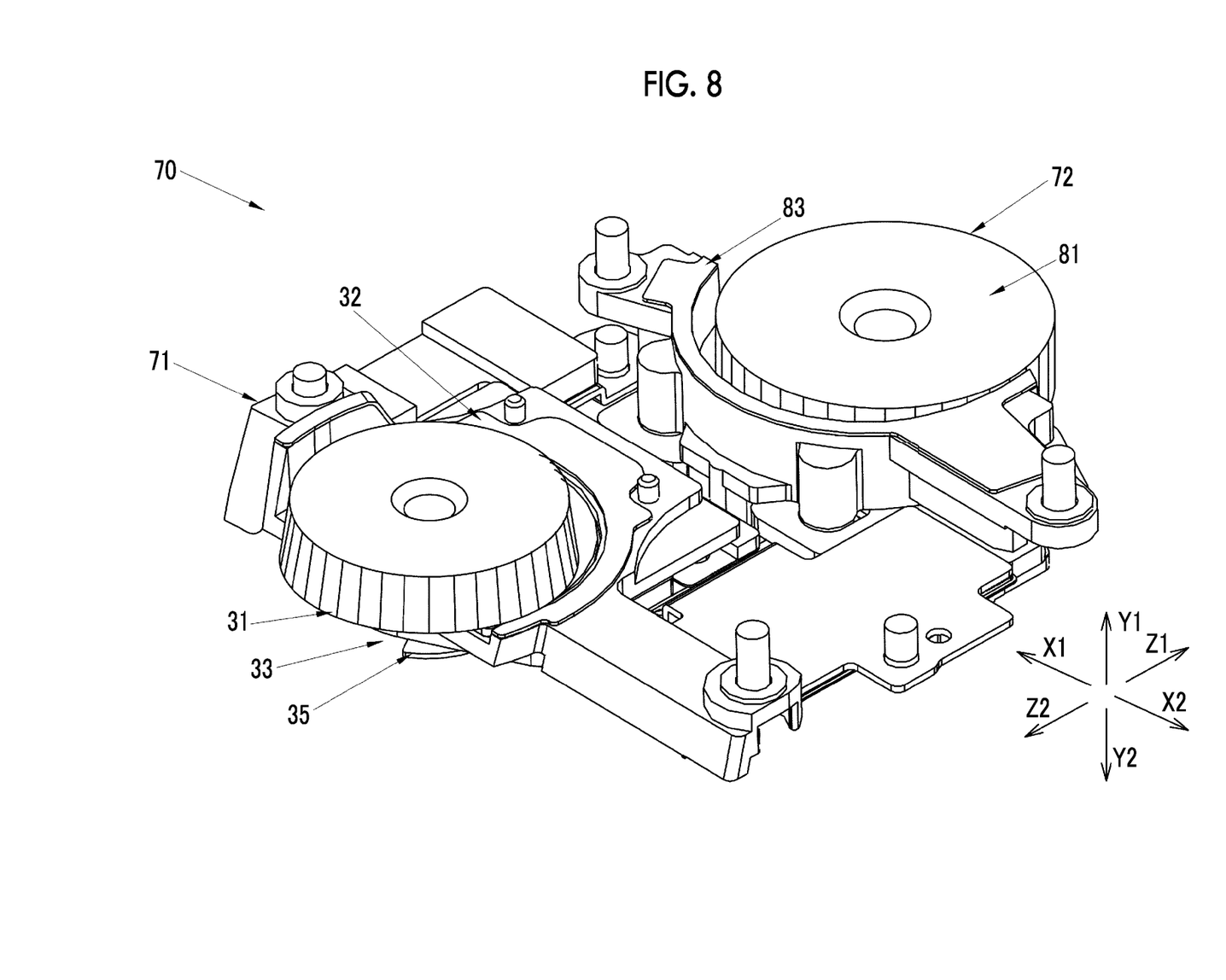
FIG. 8 is a perspective view of an operating mechanism in a second embodiment.

As shown in FIG. 8, an operating mechanism 70 of the present embodiment comprises a first dial 71 and a second dial 72. The operating mechanism 70 is incorporated in the camera body 11 of the digital camera 10 as in the first embodiment. The first dial 71 has the same configuration as the first dial 13 of the first embodiment, except for a configuration of a flexible print substrate 73. The second dial 72 corresponds to an "operating portion" in the claims. The same components and members as those in the first embodiment are denoted by the same reference numerals, and the description thereof will be omitted.

Figure 9:
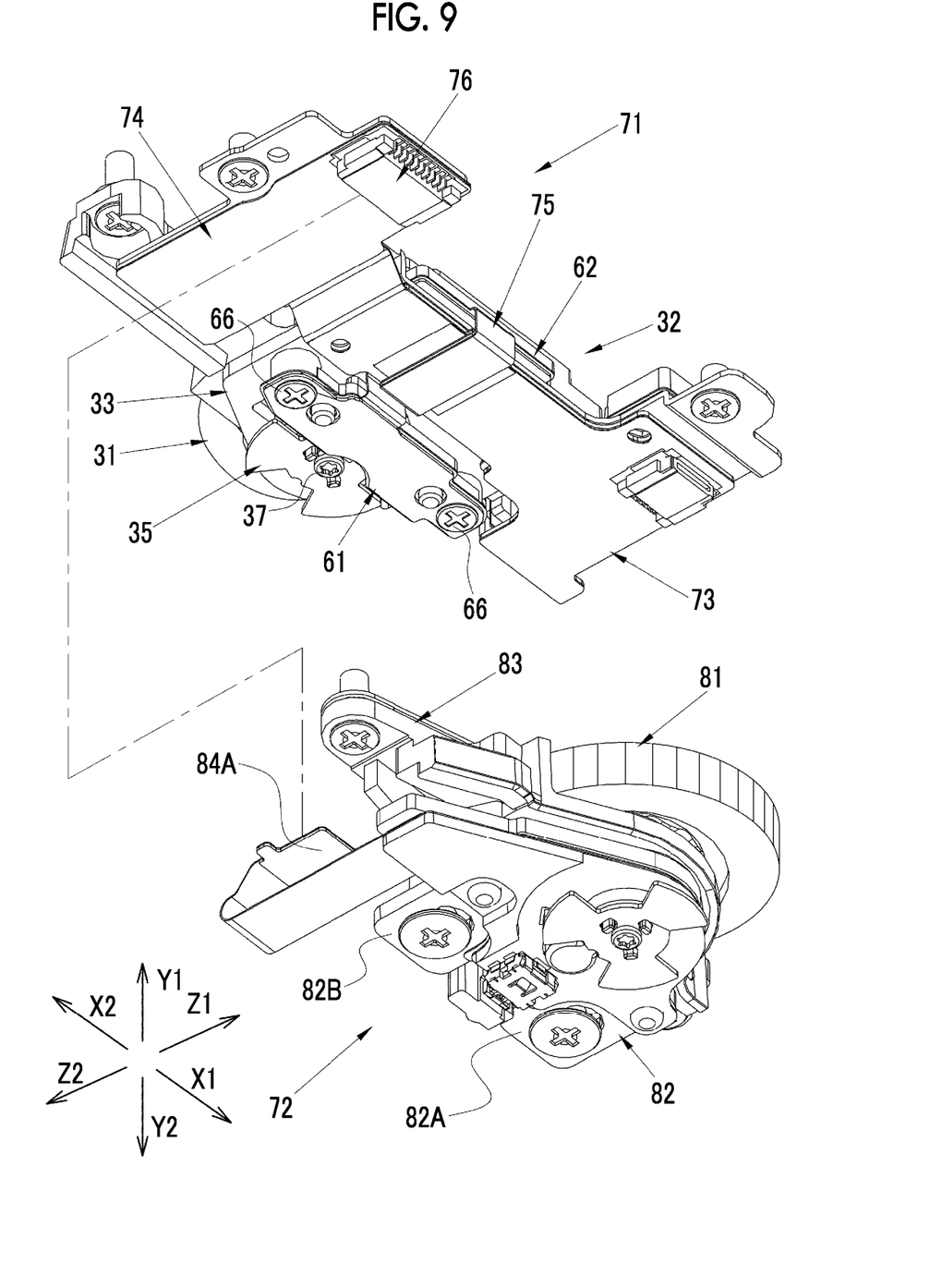
FIG. 9 is an exploded perspective view of the operating mechanism.

The first dial 71 comprises a dial member 31, a moving mechanism 32, a rotation mechanism 33, a flexible print substrate 73, and a rotary plate 35. The flexible print substrate 73 has a third mounting portion 74 and a second relay portion 75 in addition to the configuration of the flexible print substrate 34 according to the first embodiment.

The first mounting portion 61, the second mounting portion 62, the first relay portion 63, the first sensor 64, and the second sensor 65 constituting the flexible print substrate 73 are the same as those of the flexible print substrate 34 in the first embodiment.

The third mounting portion 74 is provided with a connector 76. The connector 76 is a connecting portion with the second dial 72. The third mounting portion 74 is disposed at a position that does not impede with the operation of the moving mechanism 32 and the rotation mechanism 33. For example, the third mounting portion 74 is disposed at a position in the Y1 direction or the Y2 direction with respect to the first mounting portion 61 and the second mounting portion 62.

The second relay portion 75 connects the second mounting portion 62 and the third mounting portion 74. From a positional relationship between the second mounting portion 62 and the third mounting portion 74 described above, the second relay portion 75 is disposed at a position extending from the second mounting portion 62 in the Y2 direction and turning around to the Y2 direction side of the third mounting portion 74.

Figure 10:
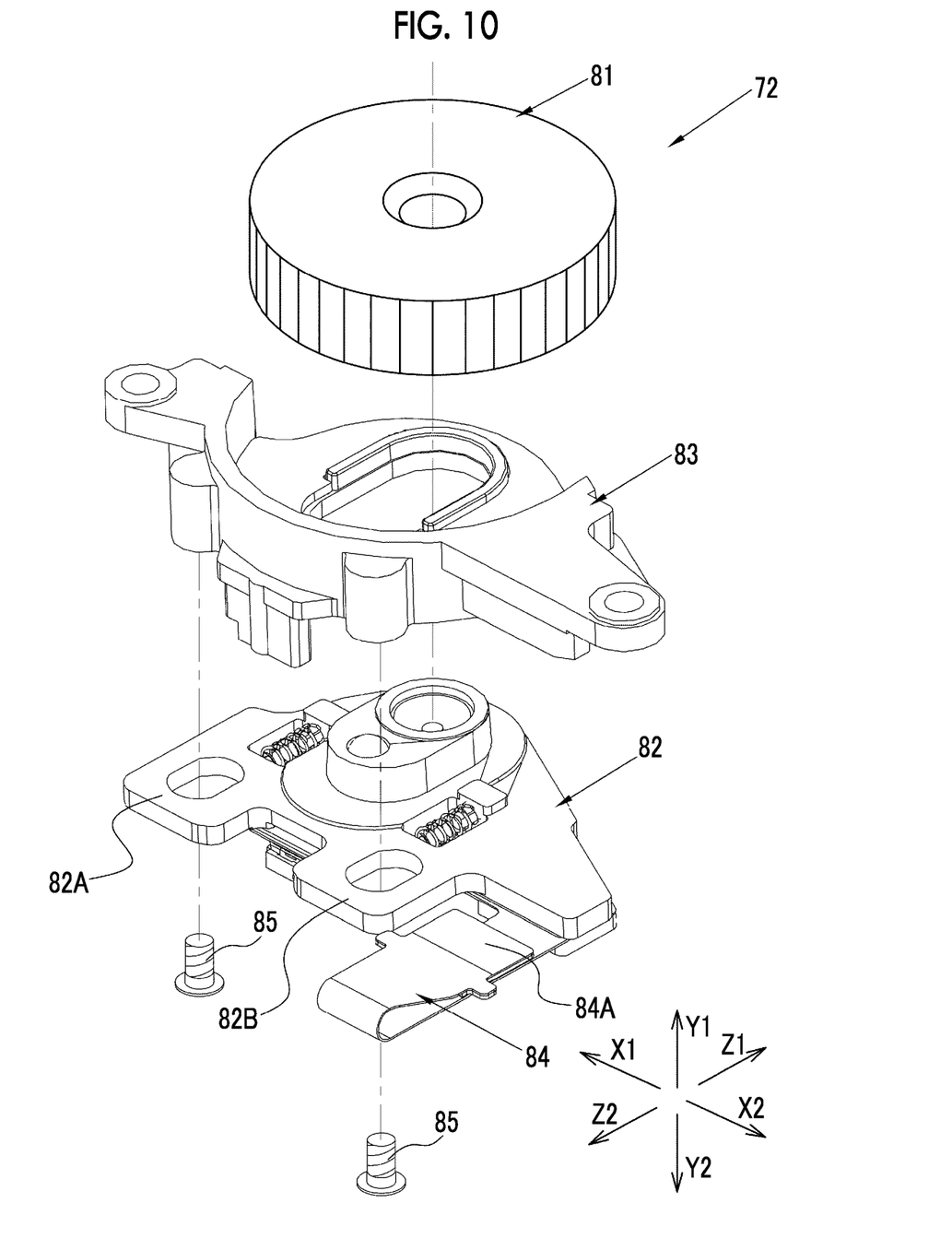
FIG. 10 is an exploded perspective view of an operating portion.

As shown in FIG. 10, the second dial 72 includes at least a dial member 81, a movable portion 82, a fixed portion 83, and a flexible print substrate 84. The second dial 72 is disposed, for example, at the same position as the second dial 17 in the first embodiment with respect to the camera body 11. The flexible print substrate 84 is provided with a connection terminal at an end part 84A and is connected to the connector 76 of the first dial 71. A sensor that detects a position of the dial member 81 and/or a controller is mounted on the flexible print substrate 84.

The movable portion 82 constitutes a moving mechanism that moves in the Z1 and Z2 directions together with the dial member 81. As with the dial member 31, the dial member 81 is a rotatable dial member that has a shaft portion. The fixed portion 83 is a member that is fixed to the inside of the exterior of the camera body 11.

In the present embodiment, the movable portion 82 moves in the Z2 direction, that is, in a direction close to the first dial 71. The movable portion 82 has a first projection portion 82A and a second projection portion 82B that protrudes toward the first dial 71. The first projection portion 82A and the second projection portion 82B are coupling portions for coupling the movable portion 82 to the fixed portion 83, and are fastened or fitted to, for example, a screw member 85 which is a fastening member. The movable portion 82 may be a member that serves as both the rotation mechanism and the moving mechanism, or may be a member that moves to simply press the switch, as with the support member 41 of the first embodiment.

Figure 11:
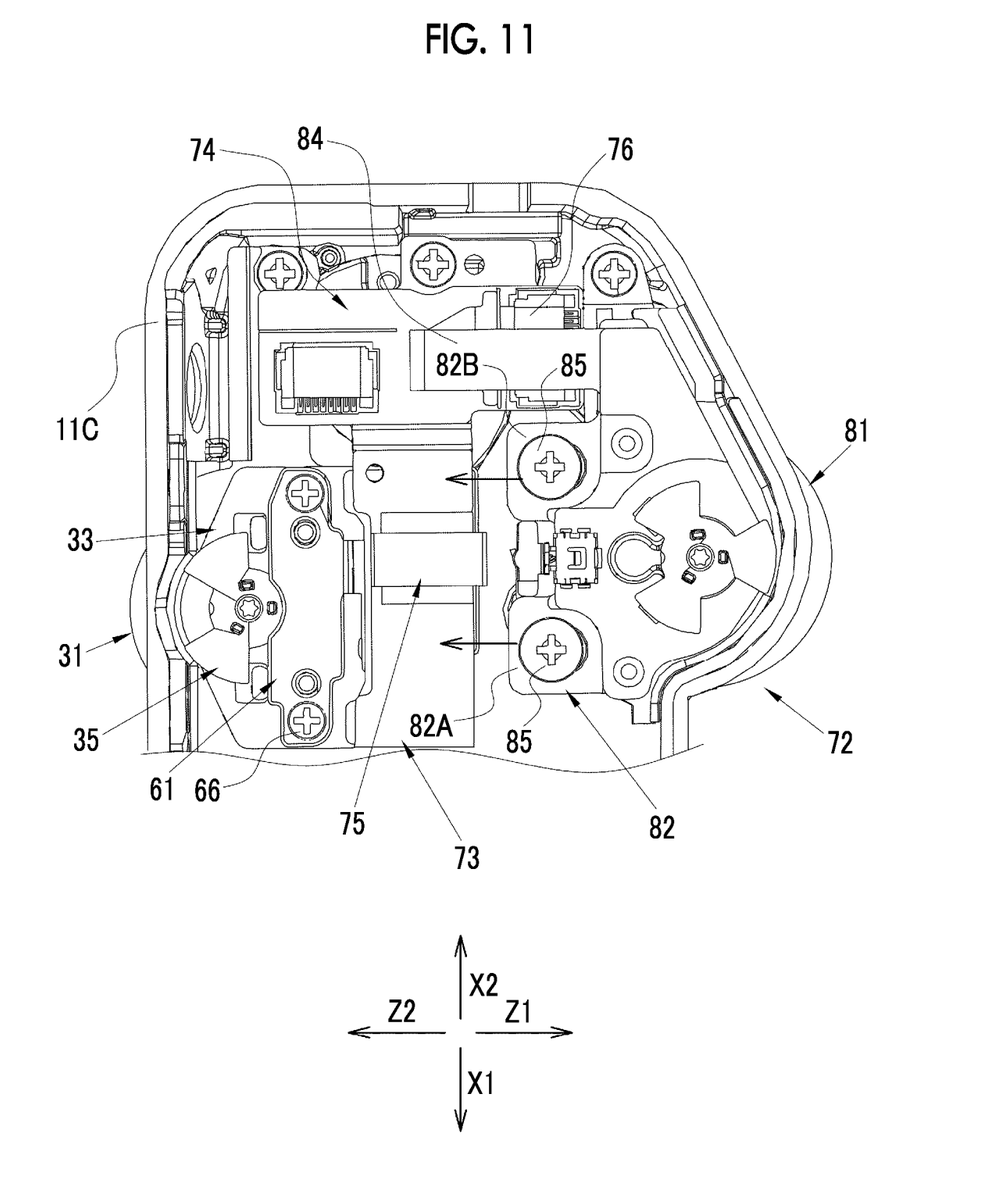
FIG. 11 is a cross-sectional view of a main part of the operating mechanism as viewed from the bottom surface side.

As shown in FIG. 11, the second relay portion 75 is disposed between the first projection portion 82A and the second projection portion 82B. A sensor or the like is disposed at a position between the first projection portion 82A and the second projection portion 82B, but there is a margin in the space at a position where the first projection portion 82A and the second projection portion 82B protrude toward the first dial 71. Therefore, in the present embodiment, in addition to the effect of the first embodiment, the efficiency of component arrangement can be improved by disposing the second relay portion 75 between the first projection portion 82A and the second projection portion 82B.

In each of the above-described embodiments, the second sensor 65 uses a mechanical switch, but the present invention is not limited to this. The sensor need only be a sensor that is switched on/off in response to the movement of the dial member 31 by the moving mechanism, for example, an optical sensor may detect a position of the dial and/or a member that moves with the dial, and may electrically detect the position by bringing contacts constituting an electrical contact type switch into contact and/or non-contact state.

The dial according to the embodiment of the present invention is not limited to the operation dial of the digital camera, and can also be applied to the operation dial of an imaging apparatus such as a smartphone or a video camera.

APPENDIX 1

A dial comprising: a rotatable dial member having a shaft portion; and an electronic member having a first sensor that detects rotation of the dial member, in which the first sensor is disposed in a direction away from the dial member with respect to an end part of the shaft portion.

APPENDIX 2

A dial comprising:
a rotatable dial member having a shaft portion; a moving mechanism that moves the dial member in a first direction; and an electronic member having a second sensor that detects a position moved by the moving mechanism, in which the electronic member is disposed on a first direction side with respect to the shaft portion.

EXPLANATION OF REFERENCES

10: digital camera
11: camera body
11A: front case
11B: rear case
11C: top case
11D: bottom case
11E: through-hole
12: lens barrel
13: first dial
14: display
15: operation button
16: lens mount
16A: imaging aperture
17: second dial
18: release switch
19: operation dial
21: imaging element
22: lens barrel body
23: imaging optical system
31: dial member
32: moving mechanism
33: rotation mechanism
34: flexible print substrate
35: rotary plate
35A: projection portion
36: shaft portion
36A: end part
37: screw member
41: support member
42: fitting portion
42A: fitting hole
43: plate-shaped portion
43A: spring member attachment portion
43B: entry prevention portion
43C: positioning pin 43D: fastening portion
43E: pressing protrusion
51: fixing member
51A: moving hole portion
51B: camera body attachment portion
51C: positioning pin
51D: fastening portion
51E: spring member accommodating portion
51F: bottom surface
52: spring member
55: screw member
61: first mounting portion
61A: fastening hole
61B: positioning hole
62: second mounting portion
62A: fastening hole
62B: positioning hole
63: first relay portion
64: first sensor
65: second sensor
65A: pressed portion
65B: case
66: screw member
67: screw member
70: operating mechanism
71: first dial
72: second dial
73: flexible print substrate
74: third mounting portion
75: second relay portion
76: connector
81: dial member
82: movable portion
82A: first projection portion
82B: second projection portion
83: fixed portion
84: flexible print substrate
84A: end part
85: screw member

What is claimed is:

1. A dial comprising:
a rotatable dial member having a shaft portion;
a moving mechanism that moves the dial member in a first direction; and
an electronic member having a first sensor that detects rotation of the dial member and a second sensor that detects a position of the dial member moved by the moving mechanism,
wherein the electronic member is disposed on a first direction side with respect to the shaft portion.

2. The dial according to claim 1,
wherein the first sensor is disposed in a direction away from the dial member with respect to an end part of the shaft portion.

3. The dial according to claim 1,
wherein the dial is an operation dial disposed in an imaging apparatus.

4. The dial according to claim 1, further comprising:
a prevention portion for preventing the electronic member from entering a rotation range of the dial member.

5. The dial according to claim 4,
wherein the prevention portion is included in the moving mechanism.

6. The dial according to claim 1,
wherein the electronic member includes:
a first mounting portion on which the first sensor is mounted;
a second mounting portion on which the second sensor is mounted; and
a first relay portion that connects the first mounting portion and the second mounting portion.

7. The dial according to claim 6,
wherein the moving mechanism has two biasing members that bias the dial member in a second direction opposite to the first direction, and
the first relay portion is disposed between the two biasing members.

8. An operating mechanism comprising:
the dial according to claim 7; and
an operating portion,
wherein the electronic member includes:
a third mounting portion having a connecting portion with the operating portion; and
a second relay portion that connects the second mounting portion and the third mounting portion,
the operating portion includes a movable portion that moves in the second direction close to the dial and that has a first projection portion and a second projection portion protruding toward a dial side, and
the second relay portion is disposed between the first projection portion and the second projection portion.

9. The dial according to claim 1, further comprising:
a rotation mechanism that rotates the dial member;
a support member that is included in the rotation mechanism and rotatably supports the dial member; and
a fastening member that screw-fastens the electronic member to the support member.

10. The dial according to claim 9,
wherein the fastening member is disposed in a direction away from the dial member with respect to the support member.

11. The dial according to claim 1,
wherein the first direction is a direction intersecting an axial direction of the shaft portion.

12. A dial comprising:
a rotatable dial member having a shaft portion;
a moving mechanism that moves the dial member in a first direction; and
an electronic member having a first sensor that detects rotation of the dial member and a second sensor that detects a position of the dial member moved by the moving mechanism,
wherein the first sensor is disposed in a direction away from the dial member with respect to an end part of the shaft portion.

* * * * *